US009053024B2

(12) United States Patent
Graefe

(10) Patent No.: US 9,053,024 B2
(45) Date of Patent: Jun. 9, 2015

(54) TRANSACTIONS AND FAILURE

(71) Applicant: Hewlett-Packard Development Company, L.P., Houston, TX (US)

(72) Inventor: Goetz Graefe, Madison, WI (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 217 days.

(21) Appl. No.: 13/690,353

(22) Filed: Nov. 30, 2012

(65) Prior Publication Data
US 2014/0157048 A1     Jun. 5, 2014

(51) Int. Cl.
*G06F 11/00* (2006.01)
*G06F 11/07* (2006.01)
*G06F 11/14* (2006.01)
*G06F 17/30* (2006.01)

(52) U.S. Cl.
CPC ........ *G06F 11/0793* (2013.01); *G06F 11/1474* (2013.01); *G06F 17/30371* (2013.01); *G06F 11/1471* (2013.01); *G06F 11/0745* (2013.01)

(58) Field of Classification Search
CPC .................... G06F 17/30356; G06F 17/30551; G06F 11/1402; G06F 11/1471; G06F 17/30368; G06F 11/1441; G06F 11/1451; G06F 11/1461; G06F 11/2066; G06F 11/2071; G06F 17/30371; G06F 17/30578; G06F 9/466; G06F 11/0745; G06F 11/0793; G06F 11/1474
See application file for complete search history.

(56) References Cited

U.S. PATENT DOCUMENTS

| | | | | |
|---|---|---|---|---|
| 5,333,303 | A * | 7/1994 | Mohan | 714/20 |
| 5,951,695 | A * | 9/1999 | Kolovson | 714/16 |
| 6,185,699 | B1 * | 2/2001 | Haderle et al. | 714/19 |
| 6,295,610 | B1 * | 9/2001 | Ganesh et al. | 714/19 |
| 6,567,928 | B1 * | 5/2003 | Lyle et al. | 714/15 |
| 6,651,073 | B1 * | 11/2003 | Lyle et al. | 1/1 |
| 7,222,133 | B1 | 5/2007 | Raipurkar et al. | |
| 8,214,687 | B2 | 7/2012 | Colaiacomo et al. | |
| 8,818,960 | B2 * | 8/2014 | Dhamankar et al. | 707/683 |
| 2007/0288530 | A1 | 12/2007 | Romem et al. | |
| 2011/0072207 | A1 * | 3/2011 | Jin et al. | 711/112 |
| 2012/0166490 | A1 | 6/2012 | Raatikka | |

OTHER PUBLICATIONS

C. Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.
C. Mohan, "A Cost-Effective Method for Providing Improved Data Availability During DBMS Restart Recovery After a Failure," Proceedings of the 19th VLDB Conference, Dublin, Ireland, Aug. 1993, pp. 368-379.
Russell Sears and Eric Brewer, "Segment-Based Recovery: Write-Ahead Logging Revisited," VLDB '09, Aug. 24-28, 2009, pp. 1-12, Lyon, France, LDB Endowment, ACM, Available at: <vldb.org/pvldb/2/vldb09-583.pdf>.

* cited by examiner

*Primary Examiner* — Marc Duncan
(74) *Attorney, Agent, or Firm* — Hewlett-Packard Patent Department

(57) ABSTRACT

Disclosed herein are techniques for system recovery. It is determined whether a transaction depends on a change committed before a failure. It is further determined whether a transaction conflicts with a change interrupted by the failure.

18 Claims, 4 Drawing Sheets

TRANSACTIONS AND FAILURE

BACKGROUND

Recovery techniques may be utilized to stabilize a system after a failure. Failures may be caused by hardware faults (e.g., power failure or disk failure), software faults (e.g., programming errors or invalid data), or human error. After a failure, applications may resume transactions only after attempting to restore the system to a consistent state. Such attempts may include repeating and reverting at least some changes that took place before the failure occurred, also known as "redo" recovery and "undo" recovery respectively. After the system is recovered, new transactions may begin. Thus, new transactions associated with a corrupted change may execute successfully, since those corrupted changes have been restored.

DETAILED DESCRIPTION

As noted above, applications may resume transactions only after the status of the system is restored to a consistent state. These attempts may include "redoing" and "undoing" changes that were unsuccessful due to the failure. However, the attempt to restore these changes may take a considerable amount of time. Users are expected to wait until the "redo" and "undo" of changes are complete before transactions are resumed. This may result in prolonged downtime for corporations or entities experiencing a failure.

In view of the foregoing, disclosed herein are a system, non-transitory computer readable medium, and method to recover from failures seemingly instantaneously. In one example, a change committed before a failure but not persisted due to the failure may be repeated when a transaction dependent on the change executes. In another example, a change interrupted by the failure may be reverted when a transaction conflicting with the interrupted change executes. Thus, rather than waiting for all corrupted changes to be restored before resuming any new transactions, a change may be restored when it is required by a resumed transaction. Such a transaction may pause during the restoration and continue after completion thereof. A transaction not associated with a corrupted change may execute normally without interruption or delay. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
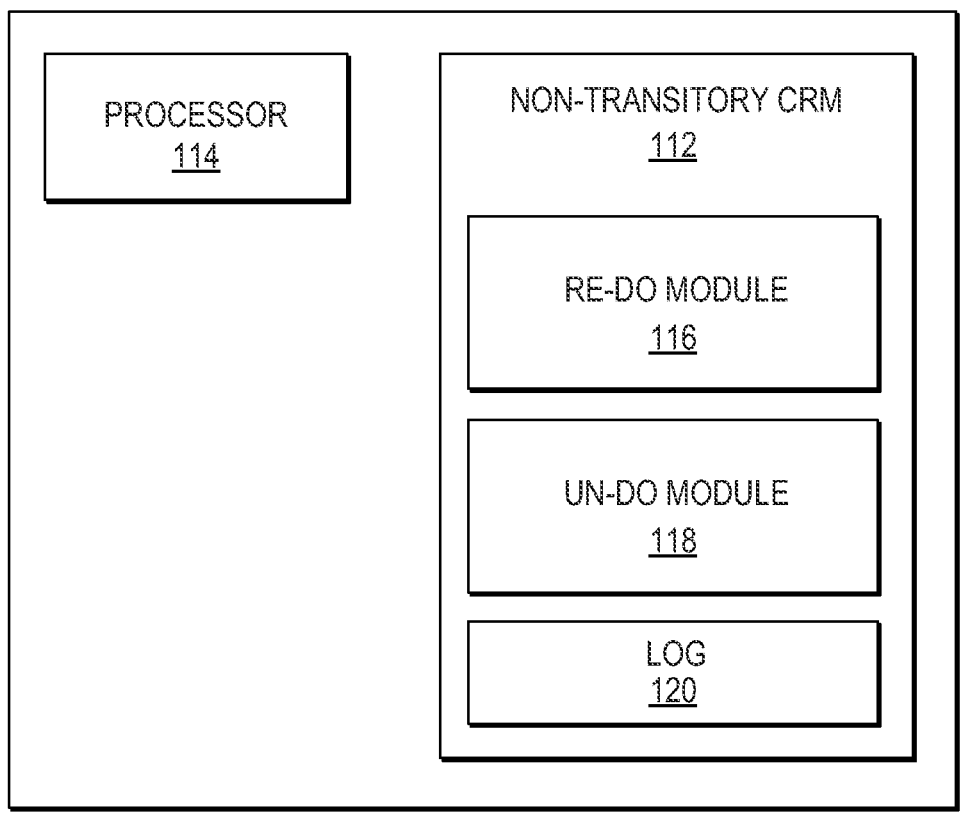
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 114, which may be any number of well known processors, such as processors from Intel® Corporation. In another example, processor 114 may be an application specific integrated circuit ("ASIC"). Non-transitory computer readable medium ("CRM") 112 may store instructions that may be retrieved and executed by processor 114. The instructions may include a re-do module 116, and an un-do module 118. Non-transitory CRM 112 may also store a system log 120 containing a record of each transaction executed in the system. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 114. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be described in more detail below, the instructions of re-do module 116 may instruct at least one processor to repeat a change committed before a failure but not persisted due to a failure, when a transaction dependent on the change executes. In one example, a change may be persisted when the change is made to a non-volatile storage medium. The un-do module 118 may revert a change interrupted by the failure, when a transaction conflicting with the interrupted change executes. In one example, a transaction may conflict with a change when the transaction attempts to access a block of data locked by a failed transaction. Such a situation may arise when a first transaction carries out a change in a buffer but does not commit the change due to a failure. Thus, a second transaction may be precluded from accessing the same block of data due to a conflict with the first transaction. In one example, a transaction may be defined as any data operation (e.g., write, delete, modify, etc.). System log 120 may contain a record of each transaction executed in the system and is not limited by any particular data structure. System log 120 may be stored in any format such as XML documents or flat files. System log 120 may be analyzed after a failure to determine which changes were corrupted and to determine whether a change needs to be "redone" or "undone."

Figure 2:
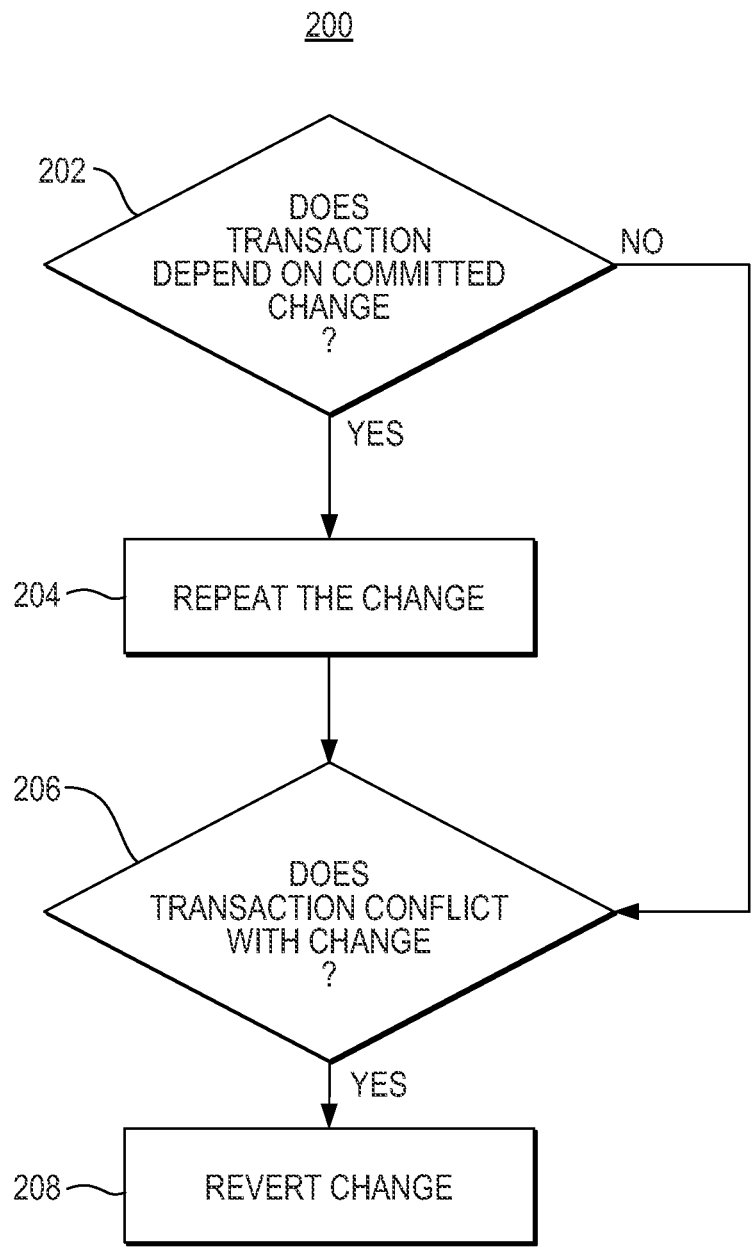
FIG. 2 is a flow diagram of an example method in accordance with aspects of the present disclosure.
Figure 3:
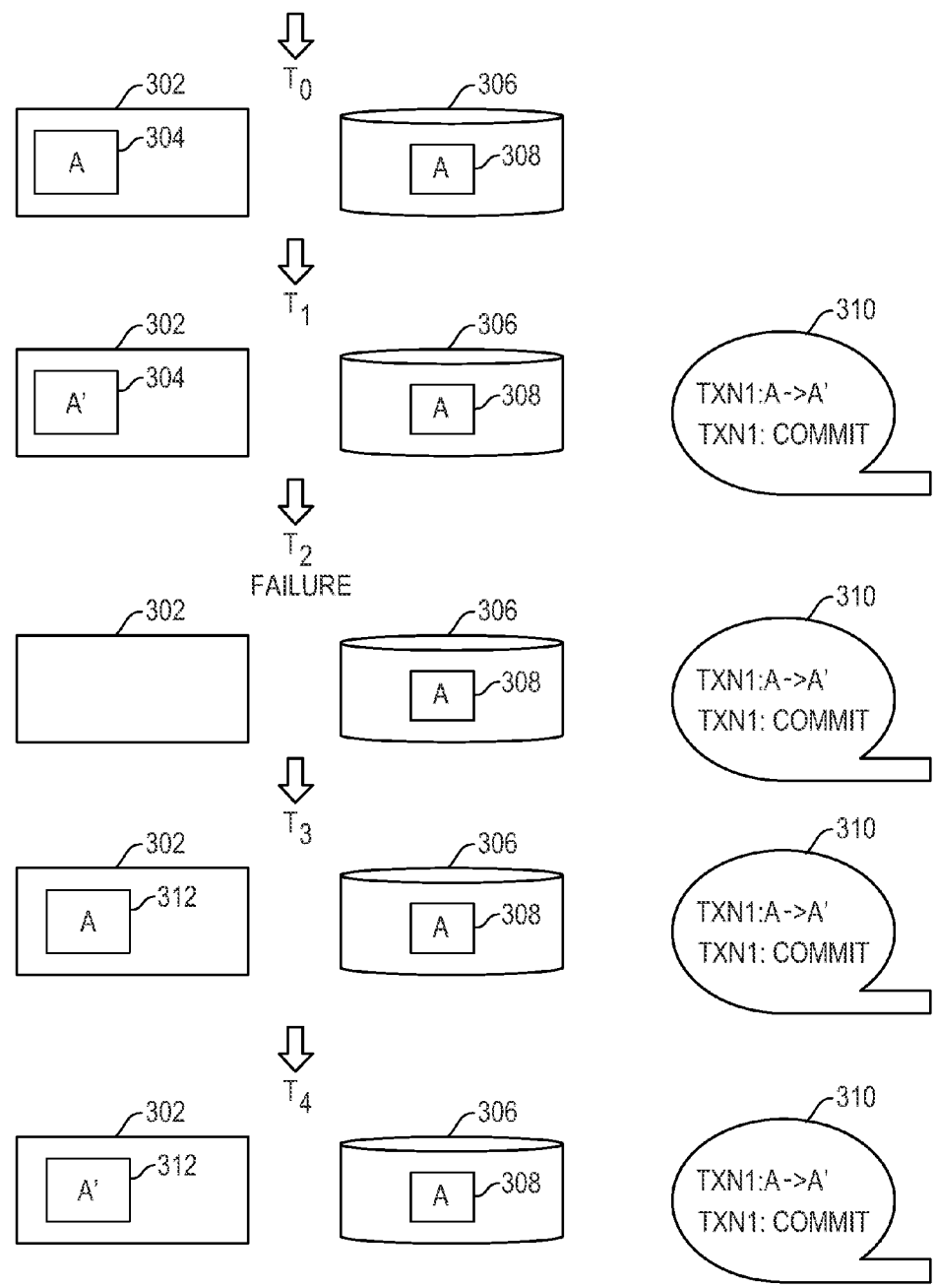
FIG. 3 is a working example in accordance with aspects of the present disclosure.
Figure 4:
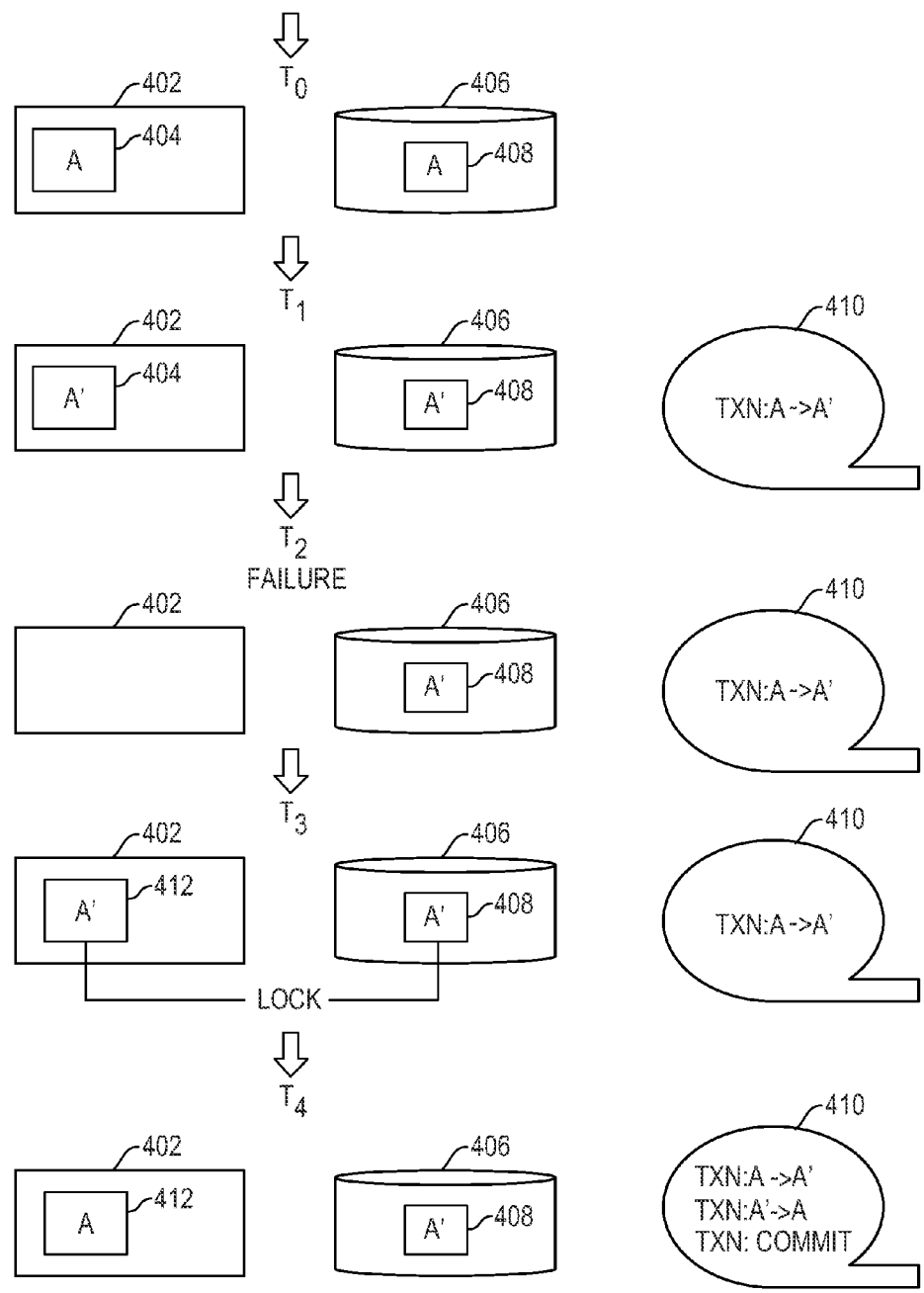
FIG. 4 is a further working example in accordance with aspects of the present disclosure.

Working examples of the system, method, and non-transitory computer-readable medium are shown in FIGS. 2-4. In particular, FIG. 2 illustrates a flow diagram of an example method 200 for accelerating system recovery. FIGS. 3-4 each show a working example in accordance with the techniques disclosed herein. While the working examples of FIG. 3-4 make reference to database recovery, it is understood that the techniques disclosed herein can be utilized to recover from any type of media failure. It is also understood that the techniques disclosed herein may also be utilized to recover from site failures (e.g., entire nodes in a distributed or parallel system failing or disconnecting from the service). The actions shown in FIGS. 3-4 will be discussed below with regard to the flow diagram of FIG. 2.

As shown in block 202 of FIG. 2, it may be determined whether a transaction depends on a committed change. FIG. 3 presents a timeline of an illustrative database failure and recovery in accordance with the techniques disclosed herein. Database 306 is shown containing a database page 308 and buffer pool 302 is shown containing a copy 304 of database page 308. Database 306 may be any database management system ("DBMS") including, but not limited to, DB2™, Informix™, or Oracle™. At time $T_0$, both buffer pool page 304 and database page 308 contain the value "A." At time $T_1$, a transaction may change the value contained in buffer pool page 304 from "A" to "A'." Such a change may be recorded in system log 310. Furthermore, at time $T_1$, the transaction may commit the change. In one example, a committed change may be defined as a change that is finalized. The commit of the change may also be recorded in system log 310, as shown in FIG. 3 at time $T_1$. At time $T_2$, a failure may occur. As shown in FIG. 3 at time $T_2$, such a failure may cause the committed change in buffer pool 302 to be erased.

Referring back to FIG. 2, if it is determined that a transaction depends on the change, the change may be repeated, as shown in block 204. Referring back to FIG. 3, at time $T_3$, the system may resume execution of transactions, and a transaction dependent on the committed change may begin execution. Since the failure caused the committed change to be erased from buffer pool 302, the transaction dependent thereon cannot continue until the change is repeated or "redone." The committed change may be repeated based on information contained in system log 310. At time $T_4$, the change may be repeated in buffer pool page 312. The transaction dependent on the change may then obtain the value "A'" from buffer pool page 312, which allows the transaction to continue execution. Thus, in this example, the repeat took place because it was required by a transaction dependent thereon so that the dependent transaction can execute successfully.

Referring back to FIG. 2, it may be determined whether the transaction conflicts with the change, as shown in block 206. Referring now to FIG. 4, another example timeline is shown. This example also includes a buffer pool 402, a database 406, and a system log 410. At time $T_0$, buffer pool page 404 in buffer pool 402 and database page 408 in database 406 are shown containing a value of "A." At time $T_1$, buffer pool page 404 is changed by a transaction from "A" to "A'." This change may be recorded in system log 410 and may be persisted in database page 408 contained in database 406 (e.g., due to contention in the buffer pool 402). At time $T_2$, a failure may occur and buffer pool 402 may be erased due to the failure. However, in this example, the change was never been committed. Thus, the transaction that originally made the change at time $T_1$ still has ownership of any database page or record associated with the change. At time $T_3$, the system may recover and a transaction conflicting with the change may begin execution.

Referring back to FIG. 2, if the transaction conflicts with the change, the change may be reverted, as shown in block 208. Referring back to FIG. 4, the transaction before the failure maintains a lock on buffer pool page 412 and database page 408. Thus, the new transaction requesting access to buffer pool page 412 or database page 408 is unable to continue. At time $T_4$, the change may be reverted or "undone" to release the lock on buffer pool page 412 and database page 408. This grants the new transaction access to buffer pool page 412 and database page 408. Access to these data sources may allow the new transaction to successfully continue execution. As with the example in FIG. 3, the undo took place because it was required by a resumed transaction so that the resumed transaction can execute successfully.

Advantageously, the foregoing system, method, and non-transitory computer readable medium accelerate recovery of systems after a failure. Rather than waiting for all the changes to be restored, transactions may resume almost immediately while changes are repeated or reverted as needed. In this regard, transactions with no association with a change corrupted by the failure may execute immediately upon recovery without interruption or delay. Transactions associated with these corrupted changes may experience a slight pause while the change in question is "undone" or redone." As such, users experience much less downtime after a failure.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
a re-do module which, if executed, instructs at least one processor to repeat a change committed by a transaction before a failure but not persisted due to the failure, the change being required by a resumed transaction, to allow the resumed transaction dependent on the change to execute successfully; and
an un-do module which, if executed, instructs at least one processor to revert a change interrupted by the failure during a transaction, the change being required by a resumed transaction, to allow the resumed transaction conflicting with the interrupted change to execute successfully.

2. The system of claim 1, wherein the change committed before the failure comprises an update to a page of data in a buffer.

3. The system of claim 2, wherein the re-do module, if executed, further instructs at least one processor to persist the change in the buffer to a data storage device.

4. The system of claim 1, further comprising a log containing a record of each transaction executed in the system.

5. The system of claim 4, wherein the re-do module, if executed, instructs at least one processor to determine whether the change committed before the failure but did not persist due to the failure based on information contained in the log.

6. The system of claim 4, wherein the un-do module, if executed, instructs at least one processor to determine the change was interrupted by the failure based on information in the log.

7. The system of claim 4, wherein the un-do module, if executed, instructs at least one processor to determine the resumed transaction conflicting with the interrupted change based on information in the log.

8. A non-transitory computer readable medium having instructions therein which, if executed, cause at least one processor to:
   determine whether a resumed transaction depends on a change committed before a failure but not persisted due to the failure;
   if the resumed transaction depends on the committed change, redo the change and continue execution of the resumed transaction;
   determine whether the resumed transaction conflicts with a change interrupted by the failure; and
   if the resumed transaction conflicts with the interrupted change, revert the interrupted change and continue execution of the resumed transaction.

9. The non-transitory computer readable medium of claim 8, wherein the committed change comprises an update to a block of data in a buffer.

10. The non-transitory computer readable medium of claim 9, wherein the instructions stored therein, if executed, further cause at least one processor to persist the committed change in the buffer to a storage device.

11. The non-transitory computer readable medium of claim 9, wherein the instructions stored therein, if executed, further cause at least one processor to determine which transactions were scheduled for execution after the failure using a log containing a record of each transaction executed in a system.

12. The non-transitory computer readable medium of claim 11, wherein the instructions stored therein, if executed, further cause at least one processor to obtain information associated with the committed change from the log, when it is determined that the resumed transaction is dependent on the committed change.

13. The non-transitory computer readable medium of claim 11, wherein the instructions stored therein, if executed, further cause at least one processor to obtain information associated with the interrupted change from the log, when it is determined that the resumed transaction conflicts with the interrupted change.

14. A method, comprising:
   determining, using at least one processor, whether a resumed transaction depends on a change committed before a failure but not persisted due to failure;
   if the resumed transaction depends on the change, repeating, using at least one processor, the committed change to allow the resumed transaction dependent thereon to execute successfully;
   determining, using at least one processor, whether the resumed transaction conflicts with a change interrupted by the failure; and
   if the resumed transaction conflicts with the interrupted change, reverting, using at least one processor, the interrupted change to allow the resumed transaction conflicting therewith to execute successfully.

15. The method of claim 14, wherein the committed change comprises an update to a block of data in a buffer.

16. The method of claim 14, further comprising obtaining, using at least one processor, information associated with a transaction prior to system failure from a log containing a record of each transaction executed in a system.

17. The method of claim 16, further comprising obtaining, using at least one processor, information associated with the committed change from the log, when it is determined that the resumed transaction depends thereon.

18. The method of claim 17, further comprising obtaining, using at least one processor, information associated with the interrupted change from the log, when it is determined that the resumed transaction conflicts therewith.

* * * * *